(12) United States Patent
Avestruz et al.

(10) Patent No.: US 12,362,570 B2
(45) Date of Patent: Jul. 15, 2025

(54) MULTIPLE PORT DC-DC CONVERTER

(71) Applicant: The Regents of the University of Michigan, Ann Arbor, MI (US)

(72) Inventors: Al-Thaddeus Avestruz, Ann Arbor, MI (US); Alireza Ramyar, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 413 days.

(21) Appl. No.: 17/348,692

(22) Filed: Jun. 15, 2021

(65) Prior Publication Data

US 2021/0391726 A1 Dec. 16, 2021

Related U.S. Application Data

(60) Provisional application No. 63/038,992, filed on Jun. 15, 2020.

(51) Int. Cl.
*H02J 3/38* (2006.01)
*H02M 1/08* (2006.01)
*H02M 3/335* (2006.01)

(52) U.S. Cl.
CPC ............ *H02J 3/381* (2013.01); *H02M 1/08* (2013.01); *H02M 3/33569* (2013.01); *H02J 2300/26* (2020.01)

(58) Field of Classification Search
CPC ........ H02J 3/381; H02J 2300/26; H02J 1/109; H02M 1/08; H02M 3/33569; H02M 3/157;

(Continued)

(56) References Cited

U.S. PATENT DOCUMENTS

2010/0148587 A1* 6/2010 Khaligh .............. H02M 3/1582
307/72
2010/0181837 A1* 7/2010 Seeker .................... H02J 1/102
307/72

(Continued)

OTHER PUBLICATIONS

R. Ayop and C. W. Tan; A comprehensive review on photovoltaic emulator; Renewable and Sustainable Energy Reviews, vol. 80, pp. 430-452, 2017.

(Continued)

*Primary Examiner* — Lincoln D Donovan
*Assistant Examiner* — Alex W Lam
(74) *Attorney, Agent, or Firm* — Lempia Summerfield Katz LLC

(57) ABSTRACT

A device for DC-DC conversion includes a plurality of input ports to receive a set of DC voltage inputs, at least one DC voltage input being configured as a differential input, a plurality of input semiconductor switches, each input semiconductor switch being coupled to a respective input port of the plurality of input ports, an inductor coupled to each input semiconductor switch, a pair of output semiconductor switches coupled to the inductor, an output coupled to the inductor via the pair of output semiconductor switches, and a processor configured to generate input switch control signals for the plurality of input semiconductor switches to sequentially and selectively connect each DC voltage input to the inductor to charge the inductor and to generate an output switch control signal for the pair of output semiconductor switches to connect the inductor to the output to discharge the inductor via the output.

22 Claims, 16 Drawing Sheets

(58) Field of Classification Search
CPC .. H02M 3/158; H02M 1/0048; H02M 3/1584; H02M 7/487; H02M 1/14
See application file for complete search history.

(56) References Cited

U.S. PATENT DOCUMENTS

| | | | |
|---|---|---|---|
| 2015/0144176 A1* | 5/2015 | Chang | H02J 3/46 136/244 |
| 2016/0134189 A1* | 5/2016 | Pregitzer | H05B 39/044 323/283 |

OTHER PUBLICATIONS

A. C. Atoche, J. V. Castillo, J. Ortego'n-Aguilar, R. Carrasco-Alvarez, J. S. G'io, and A. Colli-Menchi; A high-accuracy photovoltaic emulator system using ARM processors; Solar Energy, vol. 120, pp. 389-398, 2015.

A. H. Chang and S. B. Leeb; Differential diffusion charge redistribution for photovoltaic cell-level power balancing; 2014 International Conference on Renewable Energy Research and Application (ICRERA), Oct. 2014, pp. 576-582.

A. H. Chang, A. Avestruz, and S. B. Leeb; Capacitor-less photovoltaic cell-level power balancing using diffusion charge redistribution; IEEE Transactions on Power Electronics, vol. 30, No. 2, pp. 537-546, Feb. 2015.

A. Koran, K. Sano, R. Kim, and J. Lai; Design of a photovoltaic simulator with a novel reference signal generator and two-stage LC output filter; IEEE Transactions on Power Electronics, vol. 25, No. 5, pp. 1331-1338, May 2010.

A. Koran, T. LaBella, and J. Lai; High efficiency photovoltaic source simulator with fast response-time for solar power conditioning systems evaluation; IEEE Transactions on Power Electronics, vol. 29, No. 3, Mar. 2014; 41 pp.

A. Ramyar, X. Cui, and A. Avestruz; Two-port up/down dc-dc converter for two-dimensional maximum power point tracking of differential diffusion charge redistribution solar panel; 2019 20th Workshop on Control and Modeling for Power Electronics (COMPEL), Jun. 2019, pp. 1-8.

A. Sanaullah and H. A. Khan; Design and implementation of a low cost solar panel emulator; 2015 IEEE 42nd Photovoltaic Specialist Conference (PVSC), Jun. 2015, 6 pp.

A. Zegaoui, M. Aillerie, P. Petit, and J. P. Charles; Universal transistor-based hardware simulator for real time simulation of photovoltaic generators; Solar Energy, vol. 134, pp. 193-201, 2016.

D. D. Lu and Q. N. Nguyen; A photovoltaic panel emulator using a buck-boost dc/dc converter and a low cost micro-controller; Solar Energy, vol. 86, No. 5, pp. 1477-1484, 2012.

D. Ickilli, H. Can, and K. S. Parlak; Development of a FPGA-based photovoltaic panel emulator based on a dc/dc converter, 38th IEEE Photovoltaic Specialists Conference, Jun. 2012, pp. 001417-001421.

D. Schofield, M. Foster, and D. Stone; Low-cost solar emulator for evaluation of maximum power point tracking methods; Electronics Letters, vol. 47, No. 3, 2011; 2 pp.

G. Chu, H. Wen, Y. Yang, and Y. Wang; Elimination of photovoltaic mismatching with improved submodule differential power processing; IEEE Transactions on Industrial Electronics, vol. 67, No. 4, Apr. 2019; 12 pp.

G. Martin-Segura, J. Lopez-Mestre, M. Teixido-Casas, and A. Sudria-Andreu; Development of a photovoltaic array emulator system based on a full-bridge structure; 9th International Conference on Electrical Power Quality and Utilisation, Oct. 2007, 7 pp.

H. Nagayoshi, S. Orio, Y. Kono, and H. Nakajima; Novel PV array/module I-V curve simulator circuit; Conference Record of the Twenty-Ninth IEEE Photovoltaic Specialists Conference, 2002., May 2002, pp. 1535-1538.

H. Wu, J. Zhang, Y. Xing; A Family of Multiport Buck-Boost Converters Based on DC-Link-Inductors (DLIs); IEEE Transactions on Power Electronics, vol. 30, No. 2, Feb. 2015; pp. 735-746.

J. P. Ram, H. Manghani, D. S. Pillai, T. S. Babu, M. Miyatake, and N. Rajasekar; Analysis on solar PV emulators: A review; Renewable and Sustainable Energy Reviews, vol. 81, pp. 149-160, 2018.

K. Nguyen-Duy, A. Knott, and M. A. E. Andersen; High dynamic performance nonlinear source emulator; IEEE Transactions on Power Electronics, vol. 31, No. 3, Mar. 2016; 14 pp.

Linares, R. W. Erickson, S. MacAlpine and M. Brandemuehl; Improved Energy Capture in Series String Photovoltaics via Smart Distributed Power Electronics; 2009 Twenty-Fourth Annual IEEE Applied Power Electronics Conference and Exposition, Washington, DC, 2009, pp. 904-910.

M. C. Di Piazza, M. Pucci, A. Ragusa, and G. Vitale; Analytical versus neural real-time simulation of a photovoltaic generator based on a dc-dc converter; IEEE Transactions on Industry Applications, vol. 46, No. 6, pp. 2501-2510, Nov. 2010.

M. D. Seeman and S. R. Sanders; Analysis and optimization of switched-capacitor dc-dc converters; IEEE transactions on power electronics, vol. 23, No. 2, pp. 841-851, 2008.

M. D'Antonio, C. Shi, B. Wu, and A. Khaligh; Design and optimization of a solar power conversion system for space applications; IEEE Transactions on Industry Applications, vol. 55, No. 3, May 2019; 9 pp.

M. G. Villalva, J. R. Gazoli and E. R. Filho; Comprehensive Approach to Modeling and Simulation of Photovoltaic Arrays; IEEE Transactions on Power Electronics, vol. 24, No. 5, pp. 1198-1208, May 2009.

M. Gokdag and M. Akbaba; Implementation of differential power processing concept to switched-capacitor topology for PV submodule level power balancing; 2015 9th International Conference on Electrical and Electronics Engineering (ELECO), Nov. 2015, pp. 660-664.

M. Gokdag and M. Akbaba; A novel switched-capacitor topology for sub-module level maximum power point tracking under partial shading and mismatch conditions; 2015 6th International Conference on Modeling, Simulation, and Applied Optimization (ICMSAO), May 2015, pp. 1-5.

M. S. Zaman et al.; A Cell-Level Differential Power Processing IC for Concentrating-PV Systems With Bi-directional Hysteretic Current-Mode Control and Closed-Loop Frequency Regulation; IEEE Transactions on Power Electronics, vol. 30, No. 12, Dec. 2015; 19 pp.

M. Uno and T. Shinohara; Module-integrated converter based on cascaded quasi-Z-source inverter with differential power processing capability for photovoltaic panels under partial shading; IEEE Transactions on Power Electronics, vol. 34, No. 12, 2019; 14 pp.

M. Uno, Y. Saito, S. Urabe, and M. Yamamoto; PWM switched capacitor-based cell-level power balancing converter utilizing diffusion capacitance of photovoltaic cells; IEEE Transactions on Power Electronics, vol. 34, No. 11, Nov. 2019; 12 pp.

P. J. Binduhewa and M. Barnes; Photovoltaic emulator; 2013 IEEE 8th International Conference on Industrial and Information Systems, Dec. 2013, pp. 519-524.

P. S. Shenoy, K. A. Kim, B. B. Johnson and P. T. Krein; Differential Power Processing for Increased Energy Production and Reliability of Photovoltaic Systems; IEEE Transactions on Power Electronics, vol. 28, No. 6, pp. 2968-2979, Jun. 2013.

R. Ayop and C. W. Tan; Rapid prototyping of photovoltaic emulator using buck converter based on fast convergence resistance feedback method; IEEE Transactions on Power Electronics, vol. 34, No. 9, pp. 8715-8723, Sep. 2019.

R. C. N. Pilawa-Podgurski and D. J. Perreault; Sub-module Integrated Distributed Maximum Power Point Tracking for Solar Photovoltaic Applications; IEEE Transactions on Power Electronics, vol. 28, No. 6, Jun. 2013, 10 pp.

S. Armstrong, C. K. Lee, and W. G. Hurley; Investigation of the harmonic response of a photovoltaic system with a solar emulator; 2005 European Conference on Power Electronics and Applications, 2005, 9 pp.

S. Gadelovits, M. Sitbon, and A. Kuperman; Rapid prototyping of a low cost solar array simulator using an off-the-shelf dc power supply; IEEE Transactions on Power Electronics, vol. 29, No. 10, Oct. 2014; 8 pp.

S. J. Wright; Coordinate descent algorithms; Mathematical Programming vol. 151, 2015; 32 pp.

(56) References Cited

OTHER PUBLICATIONS

S. Jin, D. Zhang, and C. Wang; UI-RI hybrid lookup table method with high linearity and high-speed convergence performance for FPGA-based space solar array simulator; IEEE Transactions on Power Electronics, vol. 33, No. 8, pp. 7178-7192, Aug. 2018.

S. Jin, D. Zhang, L. Qu, M. Liu, X. Zhang, and Y. Gu; High-power high-dynamic-performance space solar array simulator using step-wave tracking output voltage approach; IEEE Transactions on Power Electronics, vol. 33, No. 5, May 2018; 12 pp.

S. Poovithal, S.E. Rajan, R.P. Vengatesh; Performance Evaluation of Multiport DC-DC Converter for Simultaneous Power Management of Multiple PV-Modules Application; 2015 International Conference on Circuit, Power and Computing Technologies [ICCPCT]; 2015, 6 pp.

S. Qin and R. C. N. Pilawa-Podgurski; Sub-module differential power processing for photovoltaic applications; 2013 Twenty-Eighth Annual IEEE Applied Power Electronics Conference and Exposition (APEC), L2013, pp. 101-108.

S. Sakamoto, M. Shoyama; Configuration and Control method of Bi-directional Multiport Converter for DC Power Supply System; 2018 IEEE International Telecommunications Energy Conference (INTELEC), 2018, pp. 1-5.

A. B. Grebene, Bipolar and MOS Analog Integrated Circuit Design, Hoboken NJ: Wiley, 1984, pp. 193-197.

M. Aquib, S. Jain, and V. Agarwal, "A time-based global maximum power point tracking technique for PV system," IEEE Transactions on Power Electronics, vol. 35, No. 1, pp. 393-402, Jan. 2020.

W. Kui, L. Yongdong, R. Jianye, and S. Min, "Design and implementation of a solar array simulator," in 2008 International Conference on Electrical Machines and Systems, Oct. 2008, pp. 2633-2636.

\* cited by examiner

MULTIPLE PORT DC-DC CONVERTER

CROSS-REFERENCE TO RELATED APPLICATION

This application claims the benefit of U.S. provisional application entitled "Multiple Port DC-DC Converter," filed Jun. 15, 2020, and assigned Ser. No. 63/038,992, the entire disclosure of which is hereby expressly incorporated by reference.

STATEMENT REGARDING FEDERALLY SPONSORED RESEARCH OR DEVELOPMENT

This invention was made with government support under DE-EE-0007549 awarded by the Department of Energy. The government has certain rights in the invention.

BACKGROUND OF THE DISCLOSURE

Field of the Disclosure

The disclosure relates generally to power converters and solar photovoltaic systems.

Brief Description of Related Technology

Solar energy, as a clean renewable energy resource, is an important alternative to conventional energy resources. As a result, the capacity of installed solar photovoltaic systems has been growing rapidly in recent years. However, shading is a challenge in solar photovoltaic systems. Just 10% shading can result in 30% total power loss.

Several methods have been proposed to address the shading challenge. Distributed power electronic architectures have been developed to perform maximum power point tracking (MPPT) at the module or sub-module level, including microinverters and dc optimizers. These techniques mitigate the problem by performing local maximum power point tracking. However, the techniques cannot be practically scaled down to cell-level granularity because using a distinct converter for every cell drastically increases the cost and complexity. Nonetheless, performing maximum power point tracking with cell-level granularity extracts nearly all the energy from each cell and is a useful solution in terms of maximum power point tracking efficiency. Furthermore, microinverters and dc optimizers process the full power of a solar photovoltaic system, leading to high insertion losses.

Differential power processing (DPP) is another approach to the shading challenge. Techniques that employ differential power processing exclusively process the mismatch portion of the power, which results in low insertion losses and smaller power electronics in comparison to traditional microinverters and dc optimizers. However, the realization of differential power processing with explicit power converters increases the cost because several energy storage elements (such as capacitors, inductors, and transformers) are used, which are typically expensive and bulky components in power electronics.

A switched ladder circuit is a technique that uses energy storage elements together with integrated semiconductor switches to balance the voltage among the energy storage elements.

Diffusion charge redistribution (DCR) is a technique that uses the intrinsic diffusion capacitance of solar cells together with integrated semiconductor switches to balance the voltage among the cells. Using this technique enables the performance of maximum power point tracking with cell-level granularity using only a single module-level converter. Furthermore, it does not involve using any external capacitors or inductors within the panel. Conventional diffusion charge redistribution has been modified to reduce the insertion loss. However, an external capacitance and an external inductance are added to the structure, which leads to more costs. Furthermore, conventional diffusion charge redistribution is used, so differential power processing is not preserved.

SUMMARY OF THE DISCLOSURE

In accordance with one aspect of the disclosure, a for DC-DC conversion includes a plurality of input ports to receive a set of DC voltage inputs, at least one DC voltage input of the set of DC voltage inputs being configured as a differential input, a plurality of input semiconductor switches, each input semiconductor switch of the plurality of input semiconductor switches being coupled to a respective input port of the plurality of input ports, an inductor coupled to each input semiconductor switch of the plurality of input semiconductor switches, a pair of output semiconductor switches coupled to the inductor, an output coupled to the inductor via the pair of output semiconductor switches, and a processor configured to generate input switch control signals for the plurality of input semiconductor switches to sequentially and selectively connect each DC voltage input of the set of DC voltage inputs to the inductor to charge the inductor and to generate an output switch control signal for the pair of output semiconductor switches to connect the inductor to the output to discharge the inductor via the output.

In accordance with another aspect of the disclosure, a system for power processing includes a plurality of power sources, each power source of the plurality of power sources providing a power source voltage, and a DC-DC converter coupled to the plurality of power sources. The DC-DC converter includes a plurality of input ports to receive the power supply voltages from the plurality of power supplies, a plurality of input semiconductor switches, each input semiconductor switch of the plurality of input semiconductor switches being coupled to a respective input port of the plurality of input ports, an inductor coupled to each input semiconductor switch of the plurality of input semiconductor switches, a pair of output semiconductor switches coupled to the inductor, an output coupled to the inductor via the pair of output semiconductor switches, and a processor configured to generate input switch control signals for the plurality of input semiconductor switches to sequentially and selectively connect a respective pair of input ports of the plurality of input ports to the inductor to charge the inductor and to generate an output switch control signal for the pair of output semiconductor switches to connect the inductor to the output port to discharge the inductor to a load coupled to the output.

In accordance with yet another aspect of the disclosure, a device for emulation of a plurality of solar photovoltaic cells includes a plurality of semiconductor device circuits, each semiconductor device circuit of the plurality of semiconductor device circuits being configured to replicate a diode string of a respective solar photovoltaic string of the plurality of solar photovoltaic cells, and a plurality of current sources, each current source driving a respective semiconductor device circuit of the plurality of semiconductor device circuits. The plurality of current sources are configured for operation such that a sum of output currents from the plurality of semiconductor device circuits is constant and such that an output voltage for each semiconductor device circuit of the plurality of semiconductor device circuits is equal.

In connection with any one of the aforementioned aspects, the devices and/or systems described herein may alternatively or additionally include or involve any combination of one or more of the following aspects or features. The input switch control signals and the output switch control signal establish an input duty cycle for each DC voltage input of the set of DC voltage inputs and an output duty cycle for the output. The output is not isolated from the plurality of input ports by a transformer. The processor is configured to generate the input switch control signals without a current measurement from a current sensor. The processor is configured to adjust the input switch control signals and the output switch control signal in accordance with an optimization procedure. The optimization procedure is configured as a gradient search procedure for maximum power point tracking. The optimization procedure is configured as a coordinate ascent procedure for maximum power point tracking. The optimization procedure is based on a measurement of an output voltage at the output and a measurement of a respective DC voltage input of the set of DC voltage inputs. The optimization procedure implements a control scheme having a reference voltage for the respective DC voltage input and a linear combination of duty cycles for the set of DC voltage inputs as control variables. The optimization procedure generates an input duty cycle for each DC voltage input of the set of DC voltage inputs and an output duty cycle for the output. The device further includes a capacitor coupled to the output such that discharging the inductor charges the capacitor. All but one of the DC voltage inputs of the set of DC voltage inputs are configured as differential inputs. At least one of the output voltages provided by the plurality of power sources is a differential voltage. The input switch control signals and the output switch control signal establish an input duty cycle for current provided by each pair of input ports of the plurality of input ports and an output duty cycle for the output. Each power source of the plurality of power sources includes a solar photovoltaic cell. Each power source of the plurality of power sources includes a plurality of solar photovoltaic cells. The plurality of power sources are arranged in a differential diffusion charge redistribution architecture. The plurality of power sources are arranged in a switched ladder architecture. The processor is configured to adjust the input switch control signals and the output switch control signal in accordance with an optimization procedure configured for maximum power point tracking of the plurality of power supplies. Each semiconductor device circuit includes a $V_{be}$ multiplier device. Each $V_{be}$ multiplier device includes a Darlington bipolar junction transistor pair.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
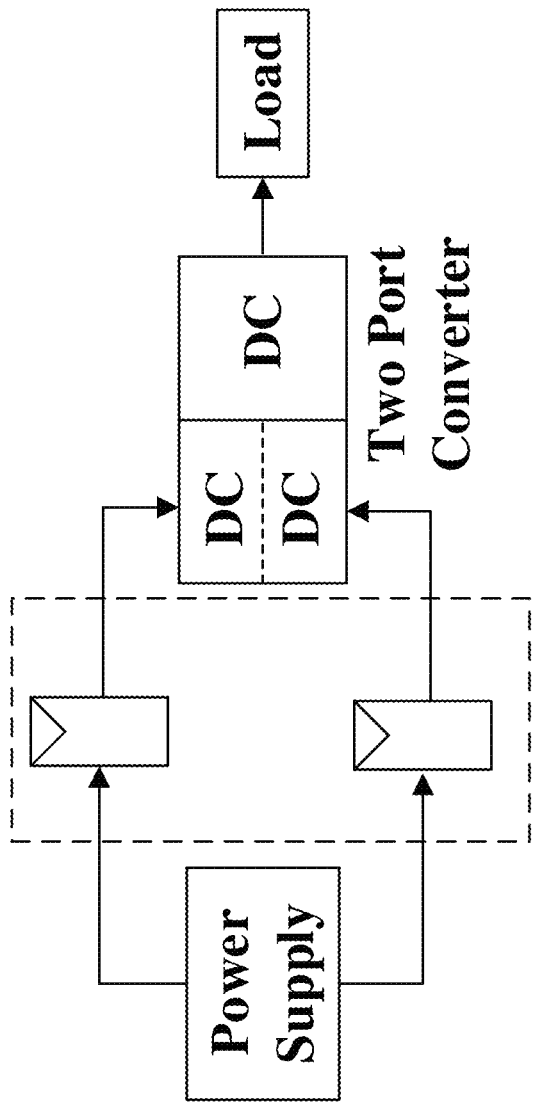
FIG. 1 is a schematic view of a system for power processing, e.g., solar power processing, with a multiple port DC-DC converter and an emulator of a differential diffusion charge redistribution architecture, in accordance with one example.

The embodiments of the disclosed devices and systems may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Devices and systems providing, involving, or otherwise including a multiple port DC-DC converter are described. The disclosed devices and systems may be implemented in connection with a differential diffusion charge redistribution (dDCR) architecture. Differential diffusion charge redistribution is a modification to a diffusion charge redistribution architecture that enables differential power processing (DPP). The disclosed devices and systems may provide string-level and/or sub-string level power electronics for differential diffusion charge redistribution and other solar panels.

Maximum power point tracking (MPPT) is one of the main challenges in solar photovoltaic systems, especially under partial shading conditions in which solar panels do not receive uniform solar irradiance. The diffusion charge redistribution (DCR) technique is an approach which uses the intrinsic diffusion capacitance of solar cells together with semiconductor switches to balance the voltage among the cells. The diffusion charge redistribution technique supports the implementation of maximum power point tracking with cell-level granularity using a single module-level converter. The differential diffusion charge redistribution (dDCR) structure is a modification to the conventional diffusion charge redistribution structure to enable differential power processing, which leads to low insertion loss because only the mismatch power is processed by every switch. In some cases, the differential diffusion charge redistribution architecture has two outputs and uses a two-port converter. Other architectures may have more outputs, in which case the converters described herein have a corresponding greater number of input ports.

Further details regarding diffusion charge redistribution structures and other differential power processing and photovoltaic power balancing are set forth in U.S. Patent Publication No. 2015/0144176, the entire disclosure of which is hereby incorporated by reference.

Although described in connection with solar panels, the disclosed devices and systems may be used with a variety of different power sources, including, for instance, batteries and/or thermoelectric cells. In some cases, the power sources may include a combination of solar and non-solar power sources. In some cases, the power sources may include external energy storage elements. In some cases, the power sources may be energy storage elements.

The disclosed converter devices are also useful in connection with a variety of different power processing architectures. The disclosed converters are thus not limited to differential diffusion charge redistribution architectures, or diffusion charge redistribution or other architectures that do not involve differential power processing. The disclosed converters are thus also not limited to switched ladder architectures.

The disclosed devices and systems may be or include a multiple (e.g., two) port up/down dc-dc converter. The converter or other disclosed devices and systems may be configured to perform or support multi- (e.g., two-) dimensional maximum power point tracking of differential diffusion charge redistribution solar panels. The disclosed converters may be configured to generate any number of output voltages for a corresponding number of loads. The disclosed devices and systems are thus not limited to applications having a single load or output voltage.

An example of a differential diffusion charge redistribution architecture is described below. Then, an example of a two-port converter is described. Following that, an example of an emulator for differential diffusion charge redistribution solar panels is presented. The emulator replicates the averaged behavior of differential diffusion charge redistribution solar panels. Then, an example of a control strategy for the converter is described. Test results are also presented to validate the capability of the converter to track the maximum power point of the differential diffusion charge redistribution emulator.

FIG. 1 depicts a block diagram a power processing system in accordance with one example. In this example, the system includes an emulator for differential diffusion charge redistribution solar panels and a two-port DC-DC converter. In some cases, the system may be configured as a differential diffusion charge redistribution solar photovoltaic system.

In a diffusion charge redistribution and differential diffusion charge redistribution solar panel system, the intrinsic diffusion capacitance of a solar cell might be as high as 10 $\mu F$. Thus, this intrinsic diffusion capacitance together with semiconductor switches may be used to balance the voltage among the cells. This technique enables the performance of maximum power point tracking with cell-level granularity, which provides desirable maximum power point tracking efficiency, using only a single module-level converter. An example 3×2 diffusion charge redistribution structure is shown in FIG. 2(a).

However, to extract the power from the right leg, two switches are used. The two switches are circled in FIG. 2(a). This leads to insertion loss even under uniform solar irradiance condition. To overcome this problem, differential diffusion charge redistribution architecture shown in FIG. 2(b) may be used. With the differential diffusion charge redistribution architecture, differential power processing is preserved.

Figure 2:
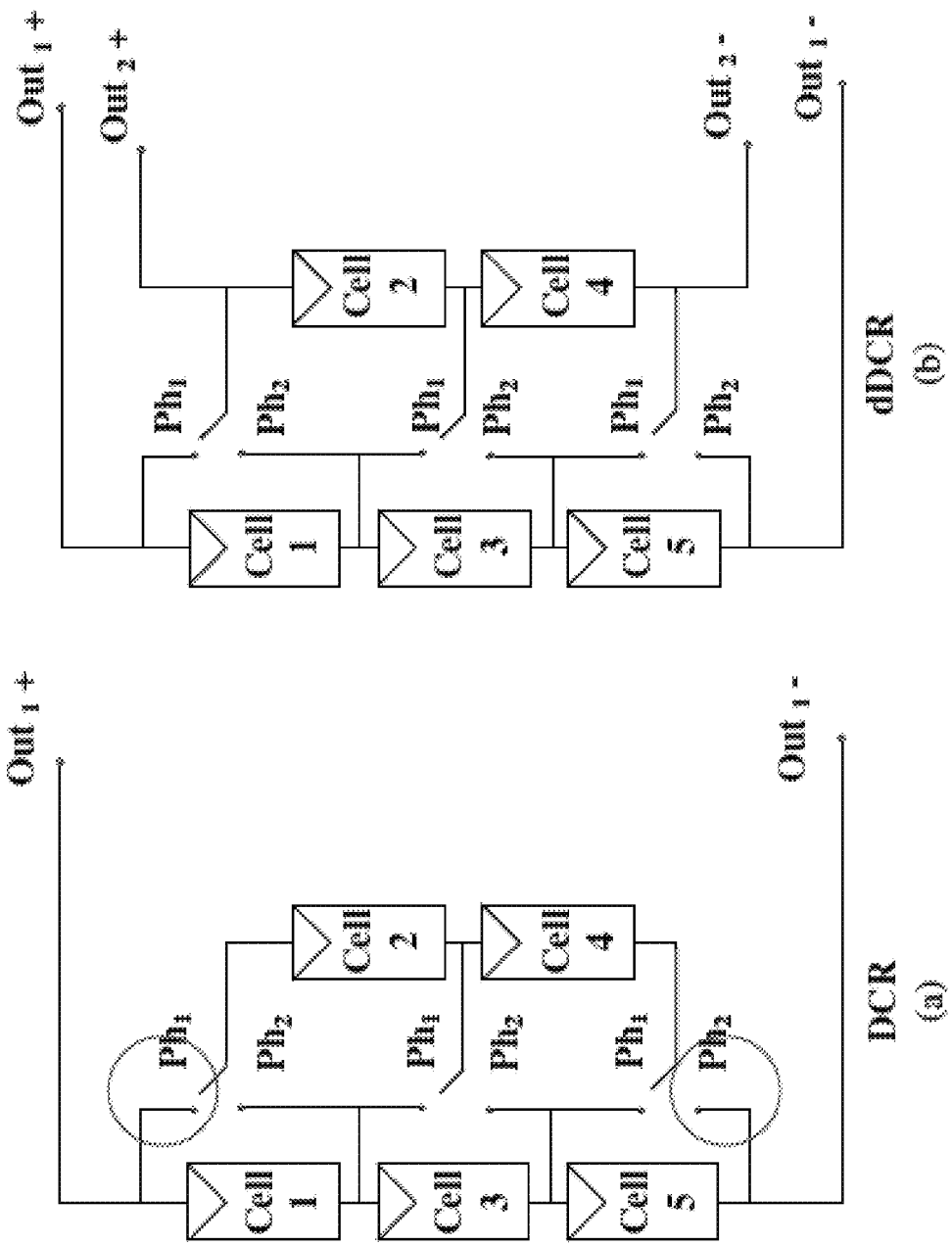
FIG. 2 depicts schematic diagrams of non-differential and differential diffusion charge redistribution architectures in accordance with two examples.

In the examples of FIGS. 1 and 2, differential diffusion charge redistribution uses a two-port string-level power converter. In some cases, a two-port up/down dc-dc converter is provided for this structure.

The operation of the example 3×2 differential diffusion charge redistribution structure shown in FIG. 2(b) is now described. As shown in FIG. 2, diffusion charge redistribution and differential diffusion charge redistribution solar panels are or include ladder structures. In this example, the solar panel includes two strings of series solar cells, which are shorted to the cells of the other string via switches. All the switches designated by Ph1 are alternately turned ON with Ph2 switches in FIG. 2. The duty cycles of all the switches are 0.5 in this case. As a result, the voltages of all the cells may be the same, even under the partial shading conditions referenced above.

Further details regarding the two-port up/down dc-dc converter of the system are now provided. The converter in this case is a two-port up/down dc-dc converter that is capable of performing two-dimensional maximum power point tracking of differential diffusion charge redistribution solar panels. In this example, the converter has two modes of operation, boost mode and buck mode. In the boost mode, the output voltage is higher than the average of the two input voltages, while in the buck mode, the output is less than the average input.

Because differential diffusion charge redistribution approximately halves the voltage compared to a conventional panel with same number of cells, the boost mode of operation is often a useful choice for this application. By using the sum of the two input voltages as the output, cables with standard current-carrying capacities can be used for the same power level. In other words, the differential diffusion charge redistribution solar panel together with the converter behaves like a standard solar panel.

For an application in which the string is large, i.e., where the voltage is higher than the output dc bus, the buck mode may be useful. For example, a residential panel configured for differential diffusion charge redistribution (22 V) can charge a 12 V battery.

Figure 3:
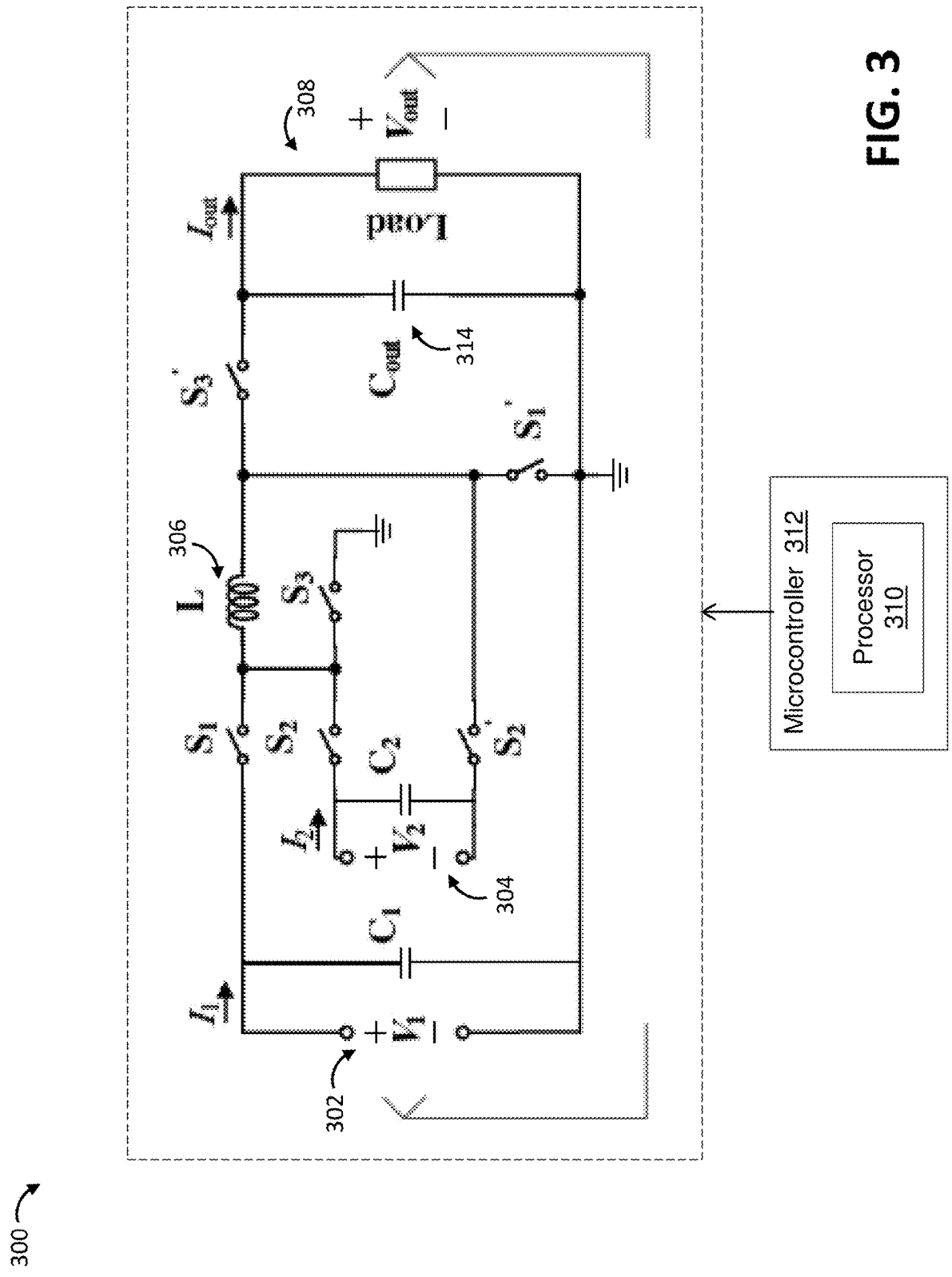
FIG. 3 is a schematic view of a multiple (e.g., two) port DC-DC converter in accordance with one example.

FIG. 3 depicts a converter device 300 in accordance with one example. In this example, the voltage-current pairs ($V_1$, $I_1$), ($V_2$, $I_2$), and ($V_{out}$, $I_{out}$) are the voltage-current pairs of input 1, input 2, and the output of the converter, respectively.

The voltage $V_1$, measured and $V_{out,measured}$ are the measured voltages of input 1 and the output, respectively. In this example, there are no current sensors in the converter 300. The absence of a current sensor may reduce costs and power losses. As a result, in this example, the converter 300 may not be used with a constant voltage load. However, with a control scheme and by incorporating one or more current sensors, the converter 300 may be connected to a constant voltage source or sink at the input or output in other cases. The application of the converter 300 to constant current and constant resistive loads is described further below.

As described herein, the converter device 300 includes a plurality of input ports 302, 304 to receive a set of DC voltage inputs (e.g., $V_1$, $V_2$). In the example of FIG. 2, the DC voltage input 304 is configured as a differential input. Additional inputs may be configured as a differential input in other cases.

As described herein, the converter device 300 includes a plurality of input semiconductor switches $S_1$, $S_1'$, $S_2$, $S_2'$. Each input semiconductor switch is coupled to one of the input ports 302, 304.

As described herein, the converter device 300 includes an inductor 306 coupled to each of the input semiconductor switches. The converter device 300 further includes a pair of output semiconductor switches $S_3$, $S_3'$ coupled to the inductor 306, and an output 308 coupled to the inductor 306 via the pair of output semiconductor switches. As shown in FIG. 3, the output 308 is not isolated from the input ports 302, 304 by a transformer.

As described herein, the converter device 300 includes a processor 310 configured to generate input switch control signals for the plurality of input semiconductor switches to sequentially and selectively connect each DC voltage input of the set of DC voltage inputs to the inductor to charge the inductor and to generate an output switch control signal for the pair of output semiconductor switches to connect the inductor to the output to discharge the inductor via the output. In the example of FIG. 3, the processor 310 is part of, or configured as, a microcontroller 312. The configuration of the processor 312 may vary from the example shown. For instance, the processor 312 may be configured as a field programmable logic array (FPGA).

The input switch control signals and the output switch control signal may establish an input duty cycle for each DC voltage input and an output duty cycle for the output, as described herein. As shown in FIG. 3, the processor 310 is configured to generate the input switch control signals without a current measurement from a current sensor.

In some cases, the processor 310 is configured to adjust the input switch control signals and the output switch control signal in accordance with an optimization procedure, as described herein. The optimization procedure may be configured as a gradient search procedure for maximum power point tracking. Alternatively, the optimization procedure is configured as a coordinate ascent procedure for maximum power point tracking. The optimization procedure may be based on a measurement of an output voltage at the output and a measurement of a respective DC voltage input of the set of DC voltage inputs, as described herein. The optimization procedure may implement a control scheme having a reference voltage for the respective DC voltage input and a linear combination of duty cycles for the set of DC voltage inputs as control variables, as described herein. The optimization procedure may generate an input duty cycle for each DC voltage input of the set of DC voltage inputs and an output duty cycle for the output, as described herein.

As shown in FIG. 3, the converter device 300 may further include an output capacitor 314 coupled to the output 308 such that discharging the inductor 306 charges the output capacitor 314. Further details regarding the output capacitor 314 during operation are set forth below.

An example involving a two-dimensional maximum power point tracking converter is now described.

Various operational variables of the power converter may be controlled. For example, terminal variables, such as input currents or voltages, output currents or voltages; may be controlled. Alternatively or additionally, internal states, such as inductor currents, and/or switch states such as average switch states (e.g., duty cycles), or cycle-by-cycle control of switches, may be controlled.

If the converter is configured to operate as an optimizing converter with an objective, such as maximum power point tracking of solar photovoltaic systems, it is useful for the objective function to be a convex function of control variables (e.g., one local optimum point, which is also the global optimum). Furthermore, it is also useful to know the valid area of operation in terms of control variables to ensure that the optimum point is reachable via control variables. In other words, the feasibility of the control strategy ought to be proven.

In some cases, two functions of terminal variables, i.e. voltage of input 1 and the ratio of input currents, are used as the control variables. As described below, the total power is a convex function of the control variables when the source, e.g., the power of differential diffusion charge redistribution solar panels, is convex. In addition, the converter can operate over the entire power range such that the control strategy is feasible.

Figure 4:
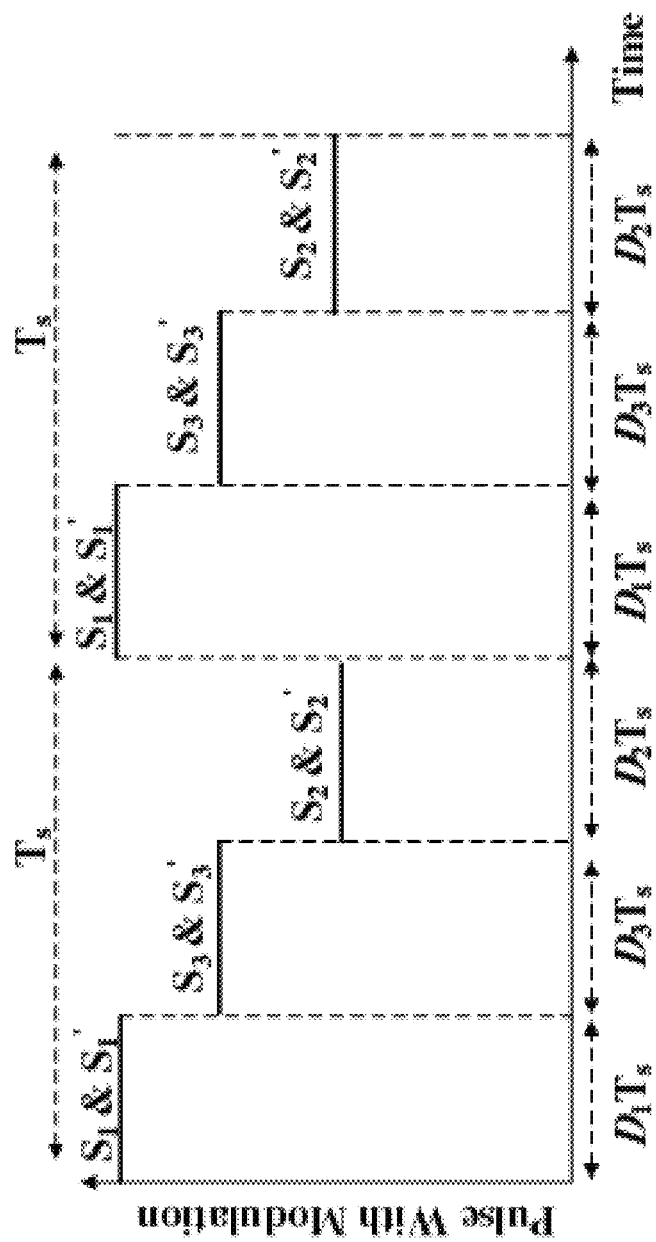
FIG. 4 is a diagram of a switching sequence of the converter of FIG. 3 in accordance with one example.

In the example of FIG. 3, the converter includes one inductor, three capacitors, and six switches. The switches may have a switching sequence as shown in FIG. 4. When switches $S_1$ and $S_1'$ are ON, the inductor is charged by the input 1. When switches $S_2$ and $S_2'$ are ON, the inductor is charged by the input 2. The inductor is discharged to the output capacitor and the load when switches $S_3$ and $S_3'$ are ON. Invoking volt-second balance for the inductor establishes the following:

$$V_1 D_1 T_s + (-V_{out}) D_3 T_s + V_2 D_2 T_s = 0, \quad (1)$$

which results in $$V_{out} = \frac{V_1 D_1 + V_2 D_2}{D_3}. \quad (2)$$

In expressions (1), (2) and illustrated in the example of FIG. 4, the parameters $D_1$, $D_2$, and $D_3$ are the duty cycles of the switches ($S_1$ and $S_1'$), ($S_2$ and $S_2'$), and ($S_3$ and $S_3'$) and the corresponding input ports, respectively and $T_s$ is the switching period. So it follows that:

$$D_1 + D_2 + D_3 = 1. \quad (3)$$

Based on the values of the duty cycles, the output voltage $V_{out}$ may be greater or smaller than $(V_1+V_2)/2$. The converter may thus be capable of working in either boost or buck modes.

For a constant current load, invoking charge balance for capacitors $C_1$, $C_2$, and $C_{out}$ establishes the following:

$$(I_L - I_1)D_1 T_s - I_1(1-D_1)T_s = 0, \quad (4)$$

$$(I_L - I_2)D_2 T_s - I_2(1-D_2)T_s = 0, \quad (5)$$

$$(I_L - I_{out})D_3 T_s + (-I_{out})(1-D_3)T_s = 0, \quad (6)$$

respectively, which results in $$I_L = \frac{I_{out}}{D_2} = \frac{I_1}{D_1} = \frac{I_2}{D_2}, \quad (7)$$

where $I_L$ is the inductor current and $I_{out}$ is the output current.

For a constant resistive load, substituting $$I_{out} = \frac{V_{out}}{R}, \quad (8)$$

into (7) gives $$I_L = \frac{V_{out}}{RD_2} = \frac{I_1}{D_1} = \frac{I_2}{D_2}, \quad (9)$$

where R is the output resistive load.

The converter includes a processor to generate switch control signals for the switches. The switch control signals may be generated in accordance with the control scheme. In the example of FIG. 3, the converter includes a microcontroller having a processor. Additional or alternative processors may be used, including, for instance, a field programmable gate array (FPGA). Input switch control signals are generated such that each DC voltage input of the set of DC voltage inputs is sequentially connected to the inductor to charge the inductor. Output switch control signal are generated for the pair of output semiconductor switches such that the inductor is connected to the output port to discharge the inductor.

Figure 5:
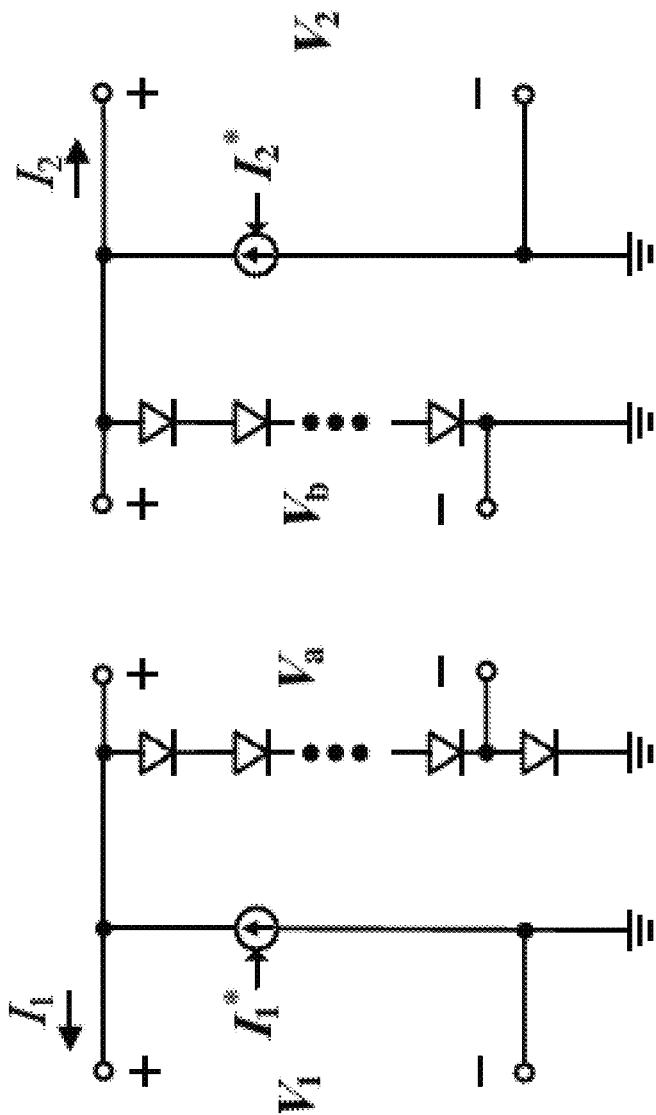
FIG. 5 is a schematic view of an emulator of a differential diffusion charge redistribution architecture in accordance with one example.
Figure 6:
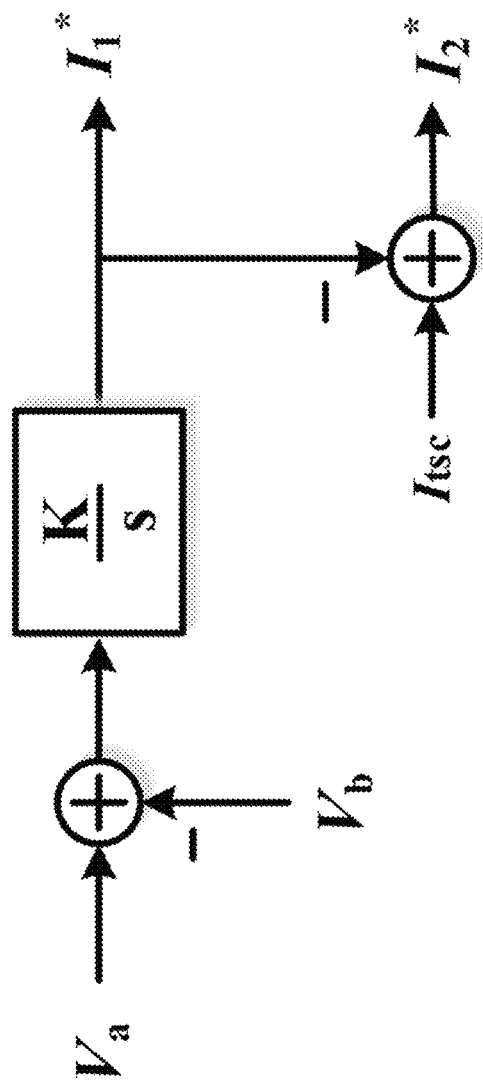
FIG. 6 is a schematic view of a control scheme of the emulator of FIG. 5 in accordance with one example.

Examples of an emulator for a differential diffusion charge redistribution architecture are now described. One example emulator is shown in FIG. 5. The emulator may be used to evaluate the disclosed devices, including, for instance, the above-described converter, or another converter or device. The emulator may be configured to replicate a differential diffusion charge redistribution panel, e.g., the average behavior of the differential diffusion charge redistribution structure described herein. As shown in FIG. 5, each string is modeled as a series of diodes in parallel with a controlled current source. FIG. 6 shows that the current sources $I_1^*$ and $I_2^*$ are controlled so that $V_a$ and $V_b$ are forced to be equal, and the sum of the two current sources ($I_{tsc}$) is constant. In FIG. 5, $V_1$, $V_2$ and $I_1$, $I_2$ are the output voltages and currents of the emulator, respectively, which may be the same variables as in expressions (1) to (9), and illustrated in FIG. 3. The current parameter $I_{tsc}$ may be $I_1+I_2$ when both outputs of the emulator are shorted. In other words, the current parameter $I_{tsc}$ may be the total short circuit current of the differential diffusion charge redistribution panel.

The emulator may operate as follows.

$$I_1 = I_1^* - I_{0,1}\left(e^{\frac{V_1}{\alpha_1 V_{t,1}}} - 1\right), \quad (10)$$

$$I_2 = I_2^* - I_{0,2}\left(e^{\frac{V_2}{\alpha_2 V_{t,2}}} - 1\right), \quad (11)$$

$$I_{tsc} = I_1^* + I_2^*, \quad (12)$$

where $I_{0,1}$, $V_{t,1}$ and $\alpha_1$ are the saturation current, thermal voltage and ideality factor, respectively, of the equivalent diode of the left string in FIG. 5. Similarly, $I_{0,2}$, $V_{t,2}$ and $\alpha_2$ are the saturation current, thermal voltage and ideality factor, respectively, of the equivalent diode of the right string in FIG. 5. Because $I_{0,1}$ and $I_{0,2}$ may be very small (e.g., on the order of $10^{-8}$ Amps), the currents I1 and I2 may be approximated as follows.

$$I_1 = I_1^* - I_{0,1}e^{\frac{V_1}{\alpha_1 V_{t,1}}} - 1, \quad (13)$$

$$I_2 = I_2^* - I_{0,2}e^{\frac{V_2}{\alpha_2 V_{t,2}}} - 1. \quad (14)$$

By introducing the variable $\beta$ and defining the voltage V2 as follows $$V_2 = \beta V_1 \quad (15)$$

mismatches among the equivalent diodes of the two strings, and also the length difference of the two strings, may be encapsulated in the variable $\beta$. In other words, the following expression applies:

$$I_2 = I_2^* - I_{0,1}e^{\frac{\beta V_1}{\alpha_1 V_{t,1}}}. \quad (16)$$

From expressions (12), (13) and (16), the following expression may be derived:

$$I_1 + I_2 = I_{tsc} - I_{0,1}\left(e^{\frac{V_1}{\alpha_1 V_{t,1}}} + e^{\frac{\beta V_1}{\alpha_1 V_{t,1}}}\right). \quad (17)$$

As shown in the example of FIG. 6, a controller may be used as part of a control loop to determine $I_1^*$ and $I_2^*$. $I_1^*$ and $I_2^*$ are the desired currents for $I_1$ and $I_2$. The desired currents may be enforced by a closed-loop controller.

Figure 7:
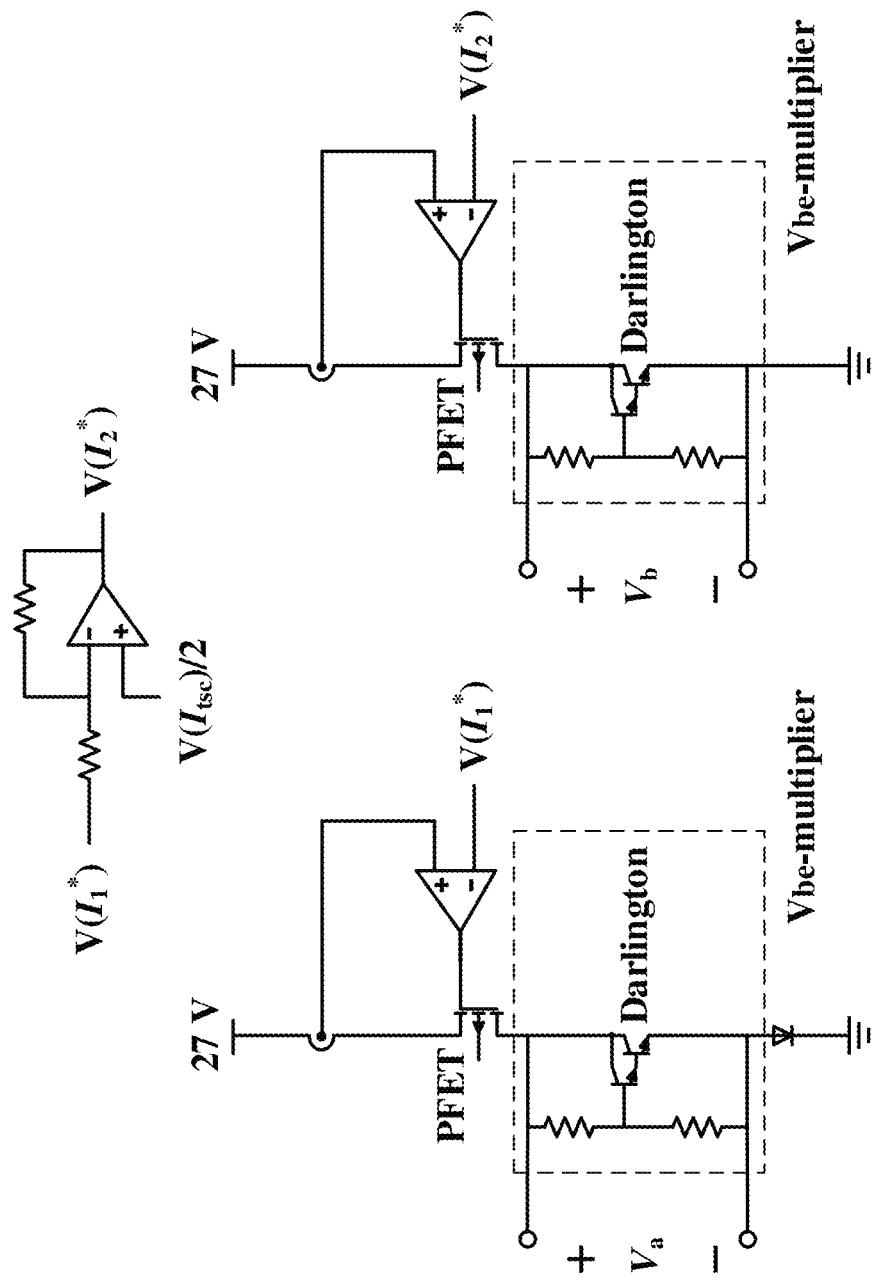
FIG. 7 is a schematic view of a transistor-based implementation of the emulator of FIG. 5 in accordance with one example.

As shown in the example of FIG. 7, an analog circuit may be used to implement the emulator. In this case, a floating PFET that is controlled in the closed loop is used as the current source. At the same time, the current command is generated by a slower feedback loop. $V_{be}$-multipliers including BJT Darlingtons are used instead of a series of diodes. A discrete diode is added to the bottom of one of the strings to replicate the longer differential diffusion charge redistribution string.

Figure 8:
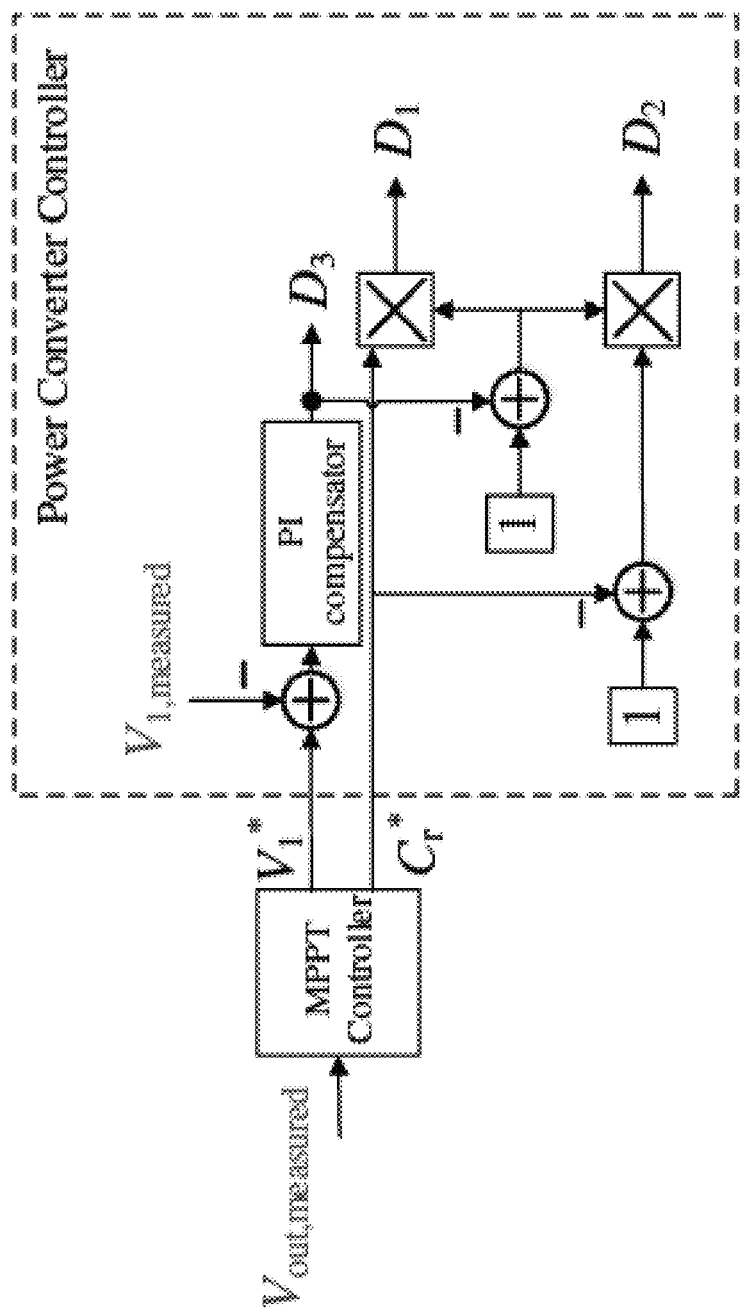
FIG. 8 is a block diagram of a controller (e.g., digital controller) of a multiple port DC-DC converter in accordance with one example.

Examples of a power converter controller to direct the disclosed converters to implement maximum power point tracking are now described. A block diagram of one example of a controller is shown in FIG. 8. In this case, $V_{1,measured}$ and $V_{out,measured}$ are the measured voltages in FIG. 3. Duty cycles for the switches are calculated from the compensator and maximum power point tracking controller.

A maximum power point tracking controller generates the parameters $V_1^*$ and $C_r^*$ based on information from the previous cycle along with $V_{out,measured}$. The maximum power point tracking controller may include a microcontroller or other processor configured to generate the parameters. The parameter $V_1^*$ is the reference voltage of the first input of the converter. The current ratio $C_r^*$ is defined as a function (e.g., linear combination) of the duty cycles as follows.

$$C_r^* = \frac{D_1}{D_1 + D_2}. \quad (18)$$

The parameter $V_1^*$ is then compared to the voltage $V_{1,measured}$ and the error goes to a compensator, such as a proportional-integral (PI) compensator. The PI compensator then generates the duty cycle parameter D3. Finally, duty cycle parameters D1 and D2 are calculated as follows.

$$D_1 = C_r^*(D_1 + D_2) \quad (19)$$

$$D_2 = (1 - C_r^*)(D_1 + D_2). \quad (20)$$

Substituting (3) into (19), and (20) results in $$D_1 = C_r^*(1 - D_3), \quad (21)$$

$$D_2 = (1 - C_r^*)(1 - D_3). \quad (22)$$

An optimization may be implemented to perform two-dimensional maximum power point tracking. For instance, a coordinate ascent method may be used in some cases. The coordinate ascent method implements an optimization procedure that successively performs maximization along each coordinate direction ($V_1^*$, $C_r^*$) individually. The maximum power point may be thus be determined. The optimization is not restricted to coordinate ascent or descent methods. For instance, gradient search methods may be used in some cases.

To perform maximum power point tracking, the control variables may be selected in accordance with the following aspects or characteristics:
(1) the output power is a convex function of the control variables,
(2) for every set of control variable values, there is a set of duty cycles with which the converter can operate,
(3) for every set of control variable values there is a set of voltages and currents that satisfies the corresponding algebraic equations, and
(4) for every possible maximum power point, there is a set of control variable values that satisfies the corresponding algebraic equations.

To ensure feasibility in this example, the parameters $V_1^*$ and $C_r^*$, as referenced above, may be chosen as the control variables. As long as the following condition applies:

$$I_{tsc} > I_{0,1}\left(e^{\frac{V_1^*}{\alpha_1 V_{t,1}}} + e^{\frac{\beta V_1^*}{\alpha_2 V_{t,1}}}\right),$$

the convexity and feasibility of the optimization may be established. There will be a set of $D_1$, $D_2$, and $D_3$ for which a $V_1^*$ and $C_r^*$ may be found.

An example of the disclosed converters and emulators was tested to evaluate the capability of the converter in performing two-dimensional maximum power point tracking. The components and the specifications of the converter are presented in Table I and Table II, respectively. A Piccolo MCU F28027 microcontroller was used as a controller or processor for digital control. For digital control, a PI controller is used as the compensator with Kp=Ki=0.001. Maximum power point tracking is performed every 50 ms and the perturbing step sizes are 0.2 V and 0.01 for $V_1^*$ and $C_r^*$, respectively.

TABLE

I. COMPONENTS

| Device | Value |
| --- | --- |
| Input Capacitors | 240 μF |
| Output Capacitor | 200 μF |
| Inductor | 34 μH |

II. CONVERTER SPECIFICATIONS

| Rated Input Voltage | 40 V |
| --- | --- |
| Rated Output Voltage | 80 V |
| Rated Input Current | 10 A |
| Maximum Power | 350 W |
| Switching Frequency | 100 KHz |

Figure 9:
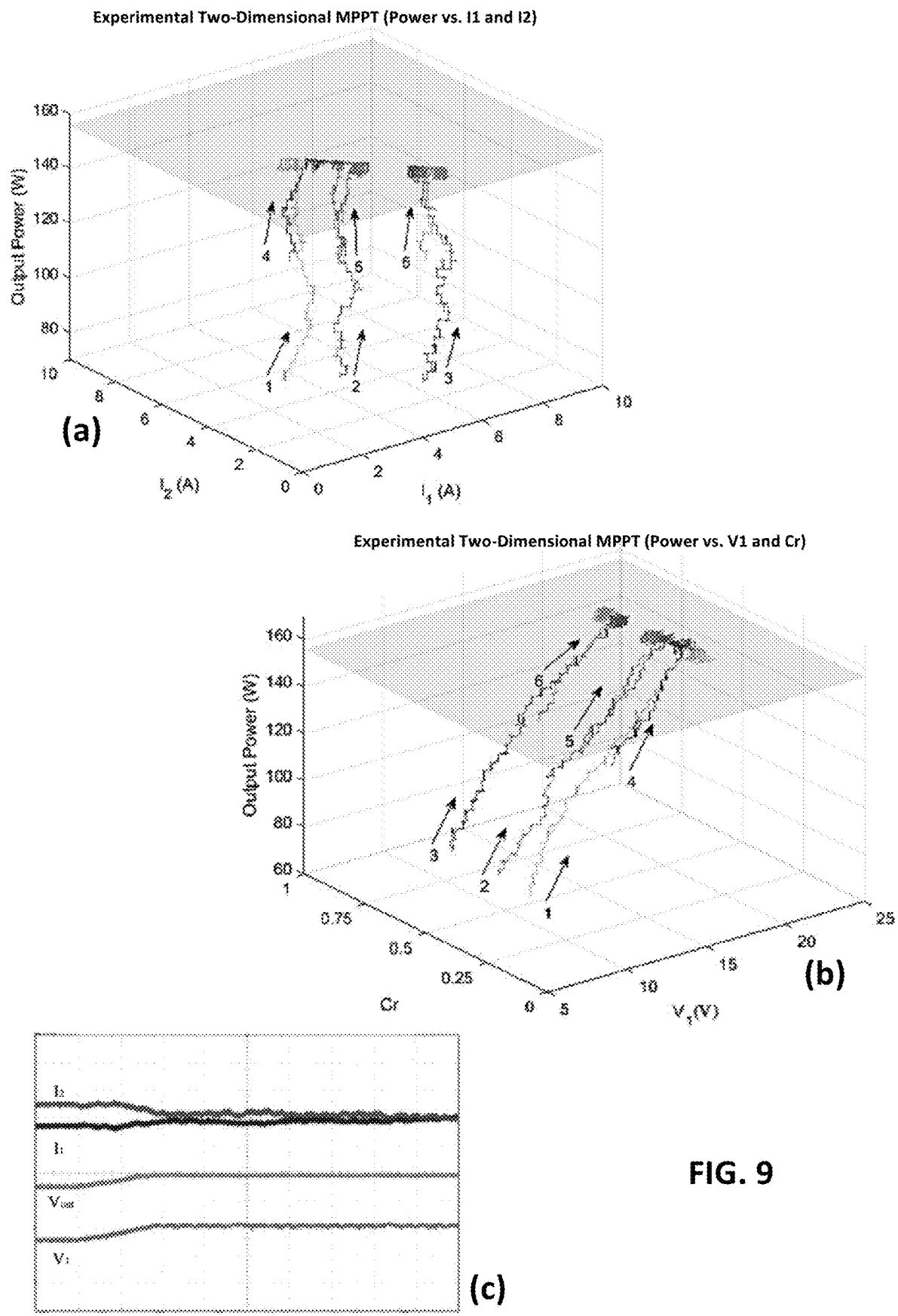
FIG. 9 depicts graphical plots of power relative to current and voltage levels, as well as a timing diagram for current and voltage waveforms, for constant current operation of a power processing system having a multiple port DC-DC converter in accordance with one example.
Figure 10:
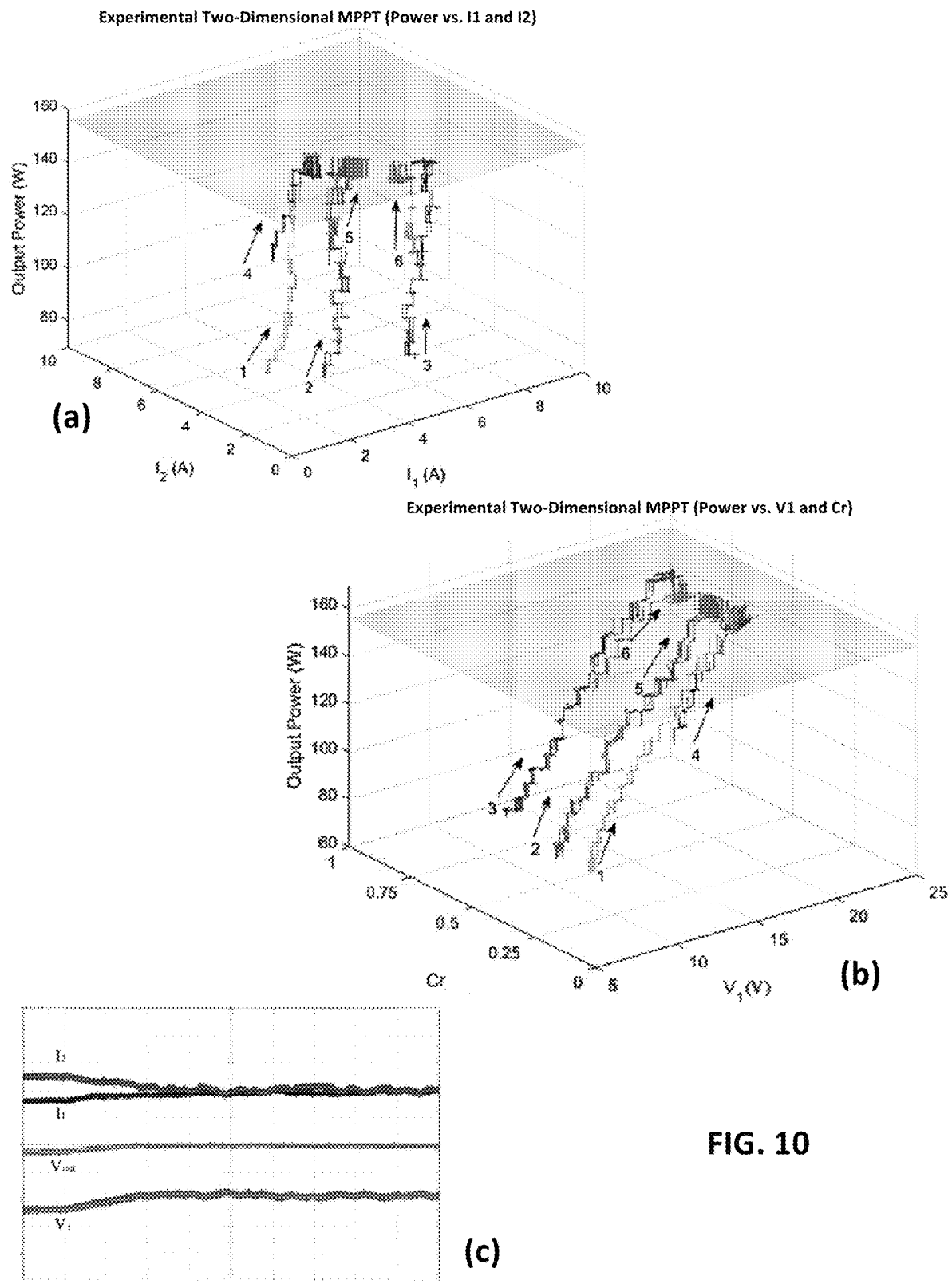
FIG. 10 depicts graphical plots of power relative to current and voltage levels, as well as a timing diagram for current and voltage waveforms, for constant resistive load operation of a power processing system having a multiple port DC-DC converter in accordance with one example.

In these tests, the emulator was supplied with 27 V at 8.5 A. The converter started up in the closed-loop (i.e. without performing maximum power point tracking) from the following ($V_1^*$, $C_r^*$) starting points: (10 V, 0.3), (10 V, 0.5), (10 V, 0.7), (15 V, 0.3), (15 V, 0.5), and (15 V, 0.7), respectively. Maximum power point tracking was then enabled after 1 s. In FIGS. 9 and 10, trajectories 1, 2, 3, 4, 5, and 6 show the path toward the maximum power point when the starting ($V_1^*$, $C_r^*$) were (10 V, 0.3), (10 V, 0.5), (10 V, 0.7), (15 V, 0.3), (15 V, 0.5), and (15 V, 0.7), respectively.

In a Constant Current Load test, a constant current load of 4 A was used as the load. FIGS. 9(a) and 9(b) show that the maximum power point was consistently 156 W for the six cases. FIG. 9(c) shows $I_1$, $I_2$, $V_{out}$, and $V_1$ waveforms for the case with starting ($V_1^*$, $C_r^*$) set to (15 V, 0.3). In less than 2 seconds, the maximum power point was reached.

In a Constant Resistive Load test, a constant resistive load of 100 was used as the load. Similar to the constant current load case, FIGS. 10(a) and 10(b) show that the maximum power point was consistently 156 W for the six cases. FIG. 10(c) also shows $I_1$, $I_2$, $V_{out}$, and $V_1$ waveforms for the case with starting ($V_1^*$, $C_r^*$) set to (15 V, 0.3). Again, the maximum power point was reached in less than 2 seconds.

As shown in FIG. 9(b) and FIG. 10(b), the value of $V_1$ at the maximum power point is about 21 V for all six cases. However, the final value of $C_r^*$ appears different for different starting points. A possible explanation for this observation follows. Based on expression [8], although $P_{tot}$ of the differential diffusion charge redistribution panel is convex with respect to ($I_1 + I_2$), it is not very sensitive to changes in $C_r^*$. $P_{tot}$ of the differential diffusion charge redistribution panel is similarly convex with respect to and strongly dependent on $V_1$. When maximum power point tracking finds a point with nearly 156 W output power and $V_1$ nearly 21 V, the change in power for different $C_r^*$ is below the resolution of the system. In other words, the power is relatively flat with respect to $C_r^*$ near the maxima and the maximum power point tracking optimization does not have enough resolution to sense the change of power for different $C_r^*$.

Figure 11:
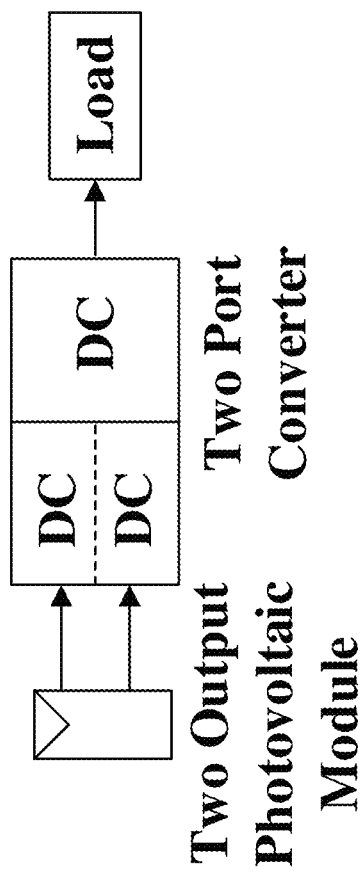
FIG. 11 is a schematic view of a system for solar power processing of DC power sources with a multiple port DC-DC converter in accordance with one example.

FIG. 11 is a schematic view of a system for solar power processing of varying DC power sources with a multiple port DC-DC converter in accordance with one example. In this example, the power processing may be or otherwise include maximum power point tracking of a multiple output (e.g., two output) photovoltaic module system. As described above, the converter may be configured to track the maximum power point of the multiple output photovoltaic module system.

Figure 12:
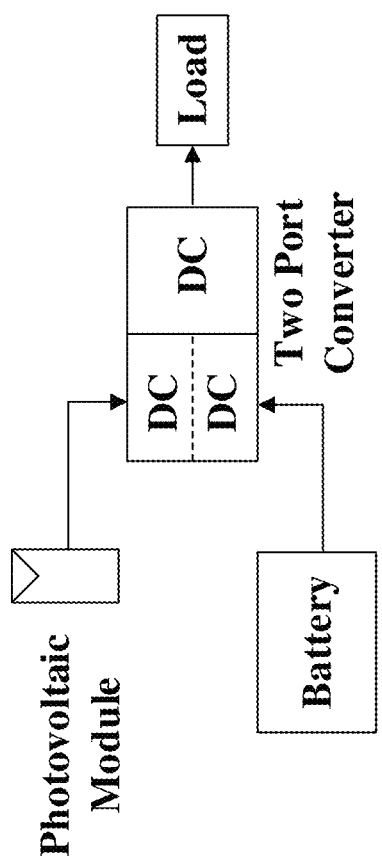
FIG. 12 is a schematic view of a system for solar and other power processing with a multiple port DC-DC converter in accordance with one example.

FIG. 12 is a schematic view of a system for solar and other power processing with a multiple port DC-DC converter in accordance with one example. In this case, the system includes multiple disparate DC power sources. In this example, the DC power sources include a photovoltaic module and a battery. Additional or alternative power sources may be included. For instance, the system may include a thermoelectric power source.

Figure 13:
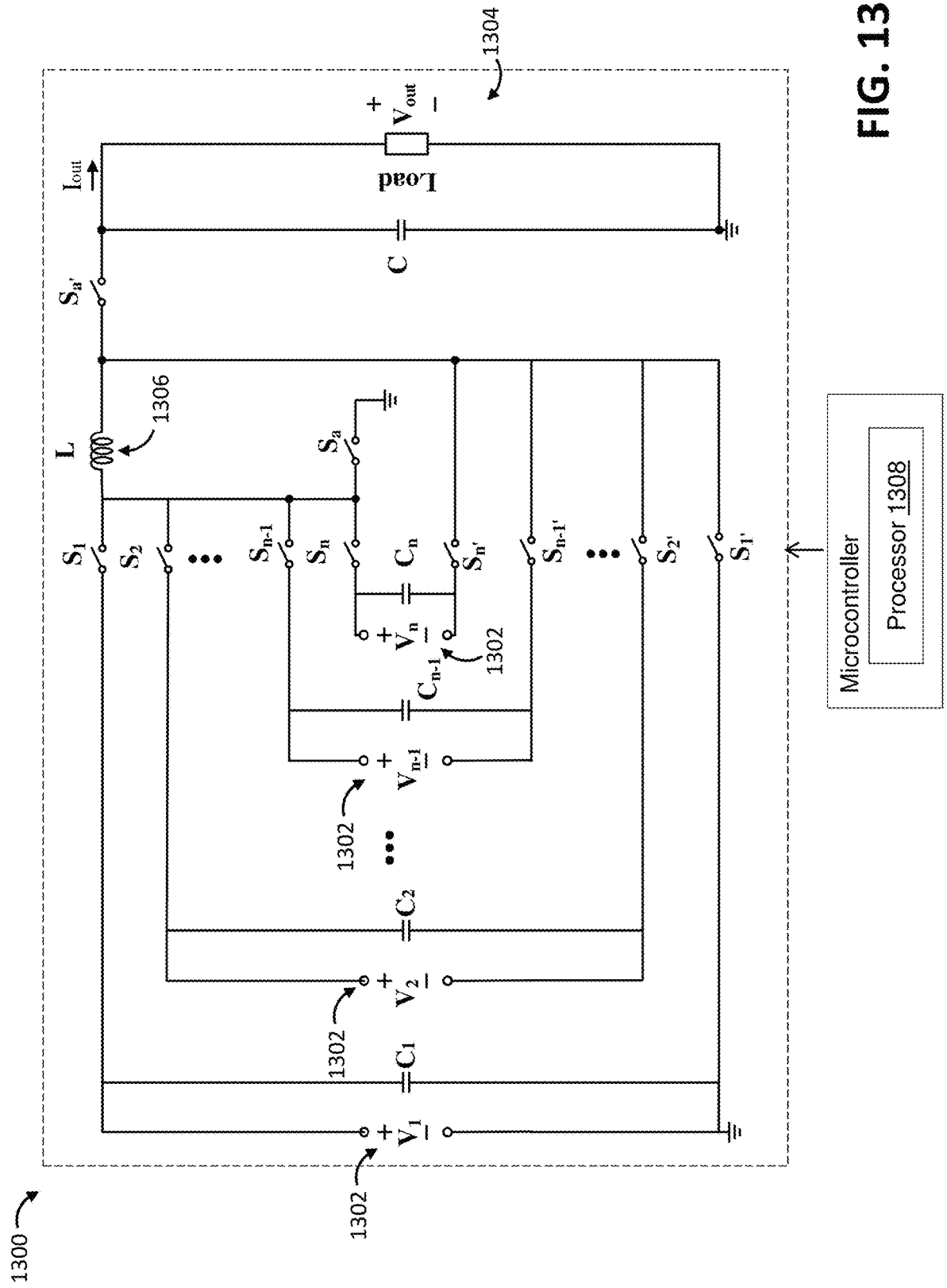
FIG. 13 is a schematic view of an N-port DC-DC converter in accordance with one example. in accordance with one example.

FIG. 13 is a schematic view of an N-port DC-DC converter device 1300 in accordance with one example. The converter may have any number N of DC voltage inputs 1302. In this example, all but one of the inputs 1302 is configured as a differential input. The converter device 1300 has a single output 1304. Given a number N of inputs 1302, the converter device 1300 includes 2*(N+1) switches (e.g., power semiconductor switches), N+1 capacitors, and a single inductor 1306. The converter device 1300 may include fewer, additional, or alternative elements. For instance, the capacitors at each pair of input ports 1302 may not be included in some cases. The converter device 1300 further includes a processor 1308, which may be configured as described herein.

In operation, the switches $S_i$ and $S_{i'}$ turn ON together and charge the inductor 1306 via the voltage across the i-th input ports. Each pair of switches may successively be activated to charge the inductor 1306. The switches $S_a$ and $S_{a'}$ turn ON together and discharge the inductor to charge the output capacitor. The output voltage may thus be determined by the level of the input voltages $V_i$ and the length of time that the corresponding switches are ON, the duty cycle $D_i$ as follows.

$$V_{out} = \frac{D_1 V_1 + D_2 V_2 + \ldots + D_n V_n}{D_a}$$

Figure 14:
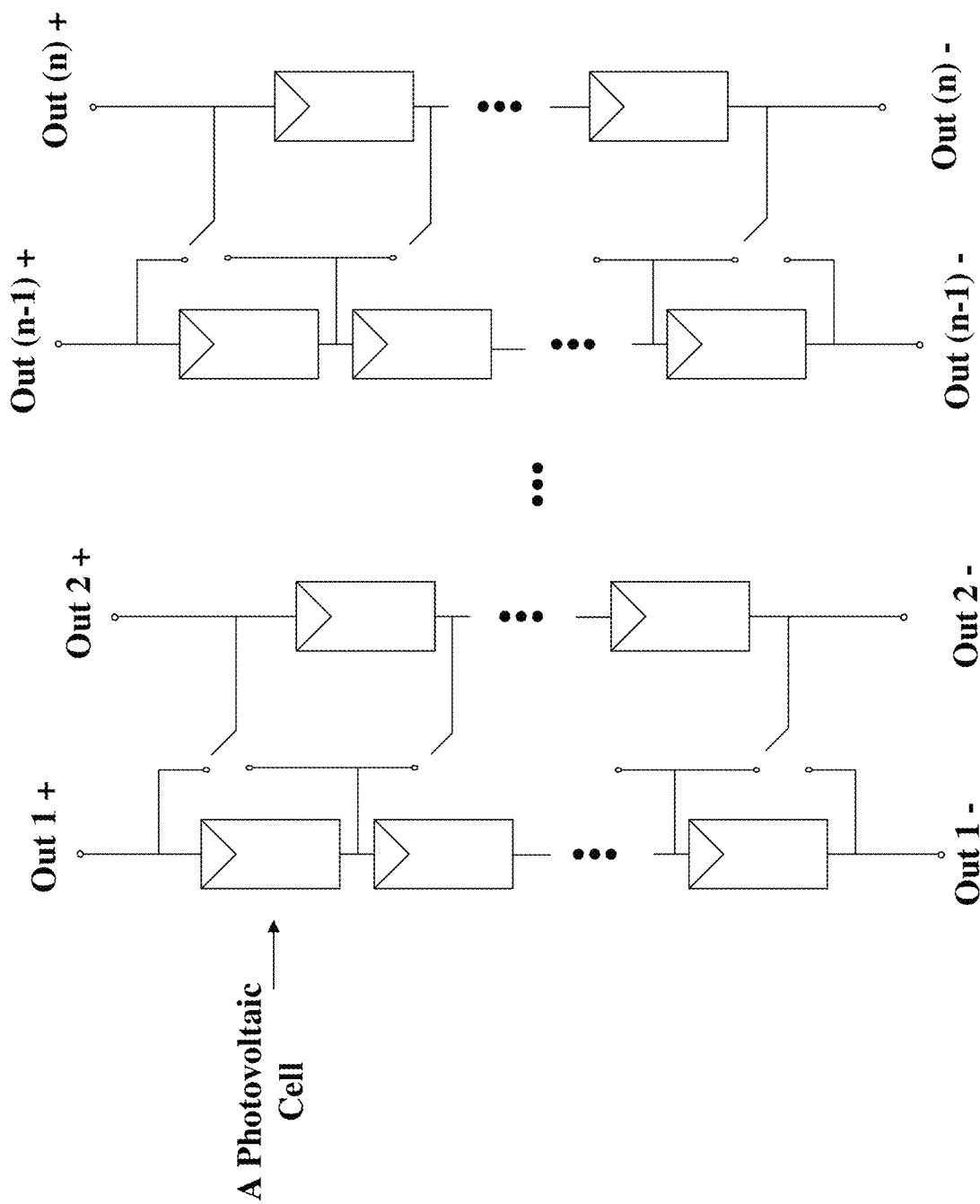
FIG. 14 is a schematic view of an N-string differential diffusion charge redistribution architecture in accordance with one example.

FIG. 14 is a schematic view of an N-string differential diffusion charge redistribution architecture in accordance with one example. The photovoltaic module systems referenced above may be configured in accordance with the architecture of FIG. 14. In this example, the photovoltaic module system includes a number N outputs (1, 2, ... N−1, N).

Figure 15:
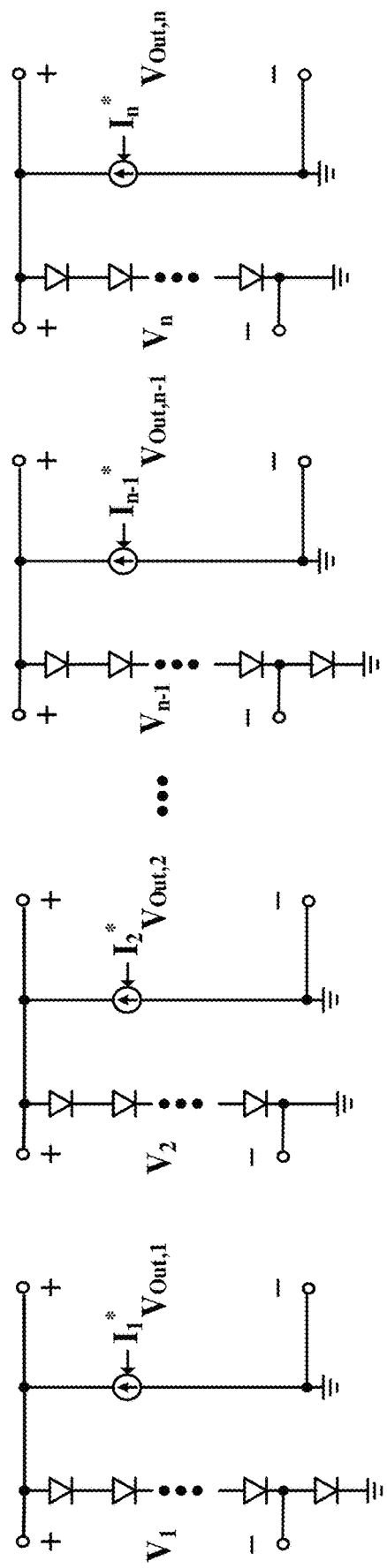
FIG. 15 is a schematic view of an emulator of a differential diffusion charge redistribution architecture configured to provide a number N of output voltages in accordance with one example.

FIG. 15 is a schematic view of an emulator of a differential diffusion charge redistribution architecture configured to provide a number N of output voltages in accordance with one example. The emulator may be configured to replicate the operation of the multiple output photovoltaic module system of FIG. 14. In operation, the multiple output emulator may be controlled in accordance with the following constraints—(1) the voltages $V_1, \ldots V_N$ are equal and (2) the summation of the currents $I_1, \ldots I_N$ is constant.

Figure 16:
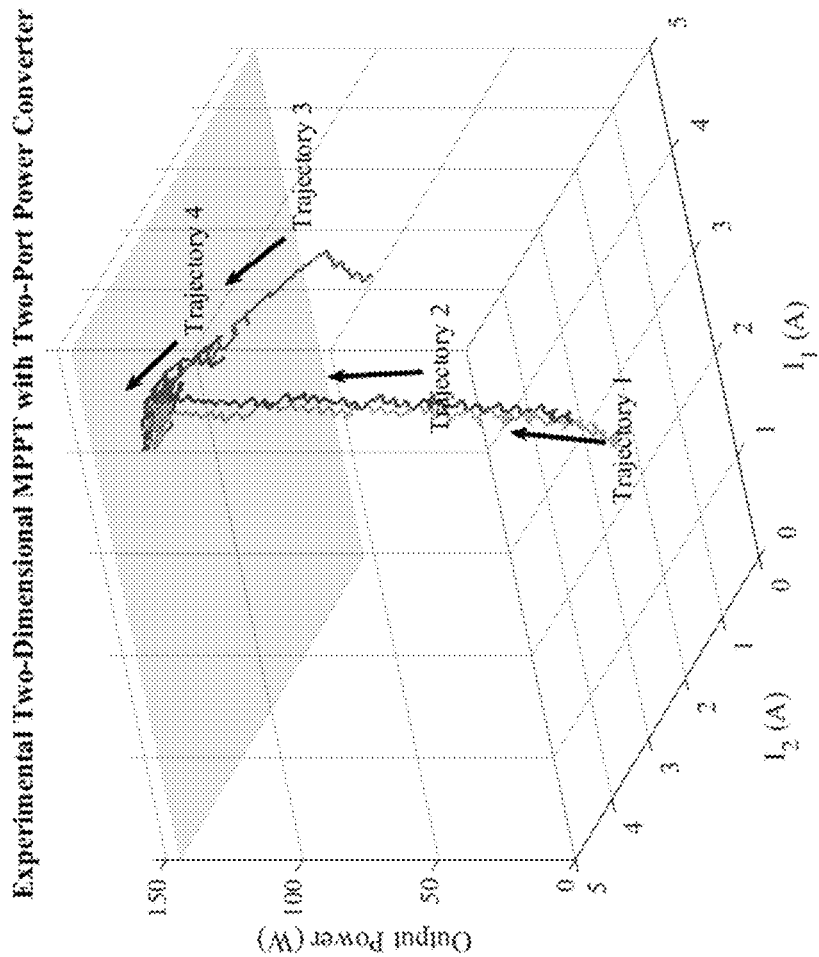
FIG. 16 is a graphical plot of multi-dimensional (e.g., two-dimensional) maximum power point tracking (MPPT) operation with a power processing system having a multiple (e.g., two) port DC-DC converter in accordance with one example.

FIG. 16 is a graphical plot of two-dimensional maximum power point tracking (MPPT) operation with a power processing system having a two-port DC-DC converter in accordance with one example. In this case, the power converter was tested from four different initial conditions. Each of the resulting four trajectories are shown. The four trajectories all end at the same maximum power point.

Described above are examples of a multiple port (e.g., two-port) up/down dc-dc converter. In some cases, the disclosed converters are configured and used to perform multi-dimensional (e.g., two-dimensional) maximum power point tracking for differential diffusion charge redistribution solar panels. Also described above are examples of an analog emulator of the differential diffusion charge redistribution panel that replicates the averaged behavior of the differential diffusion charge redistribution panel. The capability of the converter to perform maximum power point tracking on the emulator was also demonstrated.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A device for DC-DC conversion, the device comprising:
   a plurality of input ports configured to receive a set of DC voltage inputs, the plurality of input ports comprising at least one differential input port;
   a plurality of input semiconductor switches, each input semiconductor switch of the plurality of input semiconductor switches being coupled to a respective input port of the plurality of input ports;
   an inductor coupled to each input semiconductor switch of the plurality of input semiconductor switches;
   a pair of output semiconductor switches coupled to the inductor;
   an output coupled to the inductor via the pair of output semiconductor switches; and
   a processor configured to generate input switch control signals for the plurality of input semiconductor switches to sequentially and selectively connect each DC voltage input of the set of DC voltage inputs to the inductor to charge the inductor and to generate an output switch control signal for the pair of output semiconductor switches to connect the inductor to the output to discharge the inductor via the output.

2. The device of claim 1, wherein the input switch control signals and the output switch control signal establish an input duty cycle for each DC voltage input of the set of DC voltage inputs and an output duty cycle for the output.

3. The device of claim 1, wherein the output is not isolated from the plurality of input ports by a transformer.

4. The device of claim 1, wherein the processor is configured to generate the input switch control signals without a current measurement from a current sensor.

5. The device of claim 1, wherein the processor is configured to adjust the input switch control signals and the output switch control signal in accordance with an optimization procedure.

6. The device of claim 5, wherein the optimization procedure is configured as a gradient search procedure for maximum power point tracking.

7. The device of claim 5, wherein the optimization procedure is configured as a coordinate ascent procedure for maximum power point tracking.

8. The device of claim 5, wherein the optimization procedure is based on a measurement of an output voltage at the output and a measurement of a respective DC voltage input of the set of DC voltage inputs.

9. The device of claim 5, wherein the optimization procedure implements a control scheme having a reference voltage for the respective DC voltage input and a linear combination of duty cycles for the set of DC voltage inputs as control variables.

10. The device of claim 5, wherein the optimization procedure generates an input duty cycle for each DC voltage input of the set of DC voltage inputs and an output duty cycle for the output.

11. The device of claim 1, further comprising a capacitor coupled to the output such that discharging the inductor charges the capacitor.

12. The device of claim 1, wherein all but one of the plurality of input ports are configured as differential input ports.

13. A system for power processing, the system comprising:
- a plurality of power sources, each power source of the plurality of power sources providing a power source voltage; and
- a DC-DC converter coupled to the plurality of power sources, wherein the DC-DC converter comprises:
  - a plurality of input ports to receive the power supply voltages from the plurality of power supplies;
  - a plurality of input semiconductor switches, each input semiconductor switch of the plurality of input semiconductor switches being coupled to a respective input port of the plurality of input ports;
  - an inductor coupled to each input semiconductor switch of the plurality of input semiconductor switches;
  - a pair of output semiconductor switches coupled to the inductor;
  - an output coupled to the inductor via the pair of output semiconductor switches; and
  - a processor configured to generate input switch control signals for the plurality of input semiconductor switches to sequentially and selectively connect a respective pair of input ports of the plurality of input ports to the inductor to charge the inductor and to generate an output switch control signal for the pair of output semiconductor switches to connect the inductor to the output port to discharge the inductor to a load coupled to the output;
- wherein at least one of the power source voltages provided by the plurality of power sources is a differential voltage.

14. The system of claim 13, wherein the input switch control signals and the output switch control signal establish an input duty cycle for current provided by each pair of input ports of the plurality of input ports and an output duty cycle for the output.

15. The system of claim 13, wherein each power source of the plurality of power sources comprises a solar photovoltaic cell.

16. The system of claim 13, wherein each power source of the plurality of power sources comprises a plurality of solar photovoltaic cells.

17. The system of claim 13, wherein the plurality of power sources are arranged in a differential diffusion charge redistribution architecture.

18. The system of claim 13, wherein the plurality of power sources are arranged in a switched ladder architecture.

19. The system of claim 13, the processor is configured to adjust the input switch control signals and the output switch control signal in accordance with an optimization procedure configured for maximum power point tracking of the plurality of power supplies.

20. A device for emulation of a plurality of solar photovoltaic cells, the device comprising:
- a plurality of semiconductor device circuits, each semiconductor device circuit of the plurality of semiconductor device circuits being configured to replicate a diode string of a respective solar photovoltaic string of the plurality of solar photovoltaic cells; and
- a plurality of current sources, each current source driving a respective semiconductor device circuit of the plurality of semiconductor device circuits;
- wherein the plurality of current sources are configured for operation such that a sum of output currents from the plurality of semiconductor device circuits is constant and such that an output voltage for each semiconductor device circuit of the plurality of semiconductor device circuits is equal.

21. The device of claim 20, wherein each semiconductor device circuit comprises a $V_{be}$ multiplier device.

22. The device of claim 21, wherein each $V_{be}$ multiplier device comprises a Darlington bipolar junction transistor pair.

* * * * *